July 1, 1952  H. CRUZAN  2,601,745
PRESSURE CONTROL VALVE
Filed Nov. 22, 1944  2 SHEETS—SHEET 2

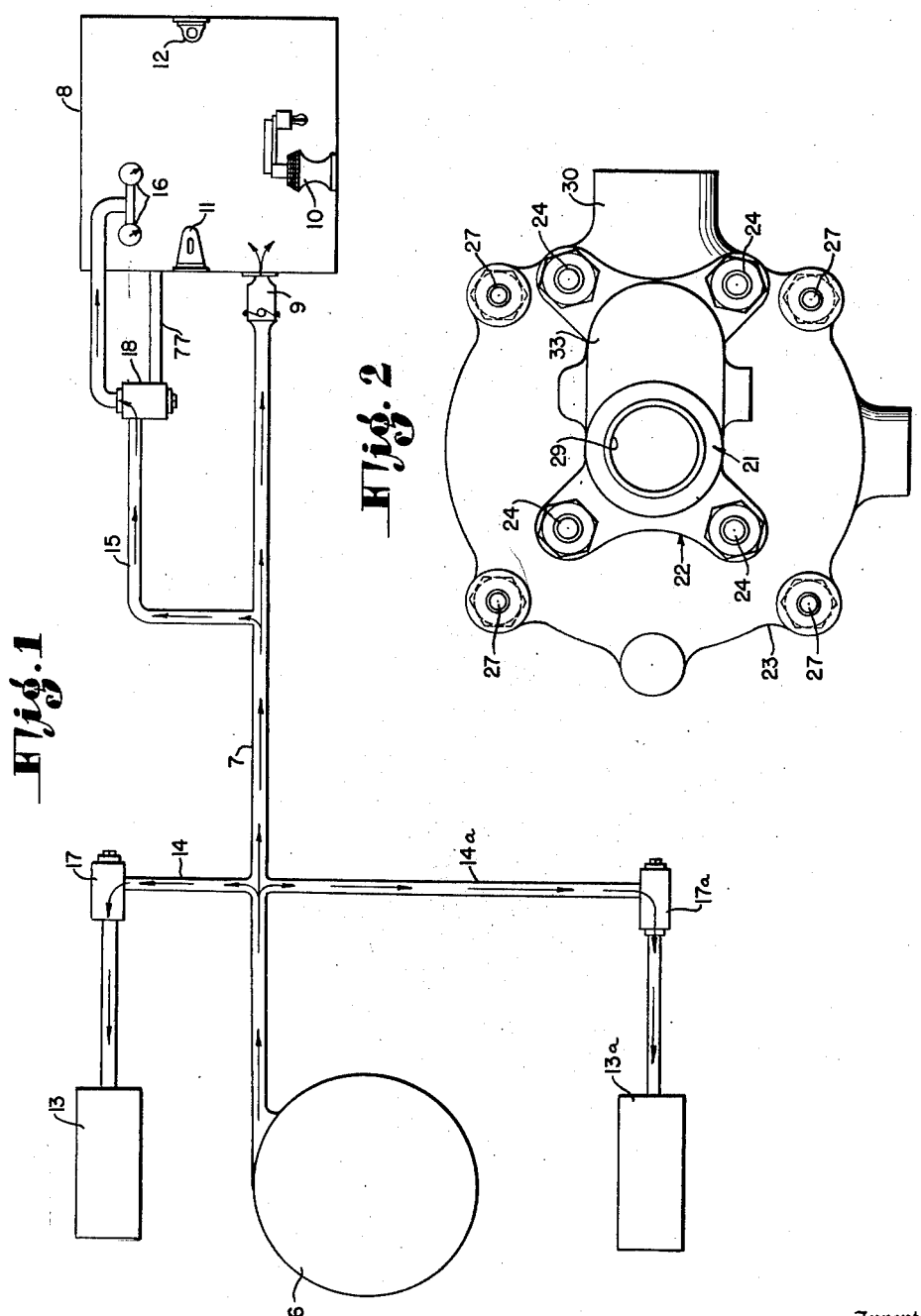

Inventor
HAROLD CRUZAN
By
Attorney

Patented July 1, 1952

2,601,745

UNITED STATES PATENT OFFICE 2,601,745

PRESSURE CONTROL VALVE

Harold Cruzan, Beverly Hills, Calif., assignor to The Garrett Corporation, Airesearch Manufacturing Company division, Los Angeles, Calif., a corporation of California Application November 22, 1944, Serial No. 564,582

3 Claims. (Cl. 50—23)

This invention relates to fluid pressure control valves and has as its object to provide a valve adapted to control the pressure in a moving stream of fluid without being affected by the fluid movement.

More specifically, the invention aims to provide a valve in which the flow of a fluid is controlled by two balanced valve elements, one closing with and the other closing against the flow of the fluid, so that the effect of the fluid pressure and flow on one valve is balanced by an opposite effect on the other valve.

Another object of the invention is to provide, in a balanced valve, a simple arrangement whereby both valve elements are adapted to be simultaneously moved toward open or closed positions by a pressure responsive actuator.

A further object is to provide, in such a valve, an arrangement ensuring the full seating of both valve elements.

Another object is to provide a pressure control valve adapted to be employed in a fluid pressure system in which a fluid is pumped from a source of pressure to a chamber adapted to hold the fluid under pressure, said valve being adapted, in the event of failure of the source of pressure, to hold the pressure in the chamber.

Another object of the invention is to provide a fluid pressure control valve incorporating pressure relief means for avoiding damage to the valve mechanism from pressure surges in the system controlled by the valve.

The invention is particularly applicable to the control of pressures in measuring instruments wherein the pressure must be controlled with accuracy, and it is also adaptable to the control of the pressurization of fuel tanks for aircraft, etc.

In addition to the foregoing objects, the invention aims to provide a valve which is of relatively simple construction, and easily serviced.

Further objects and advantages of the invention will appear in the following part of the specification.

Referring to the drawings which are for illustrative purposes only:

Fig. 1 is a schematic diagram of an aircraft cabin pressurization system incorporating a number of valves embodying the invention;

Fig. 2 is a plan view of one of the valves;

Figure 3:
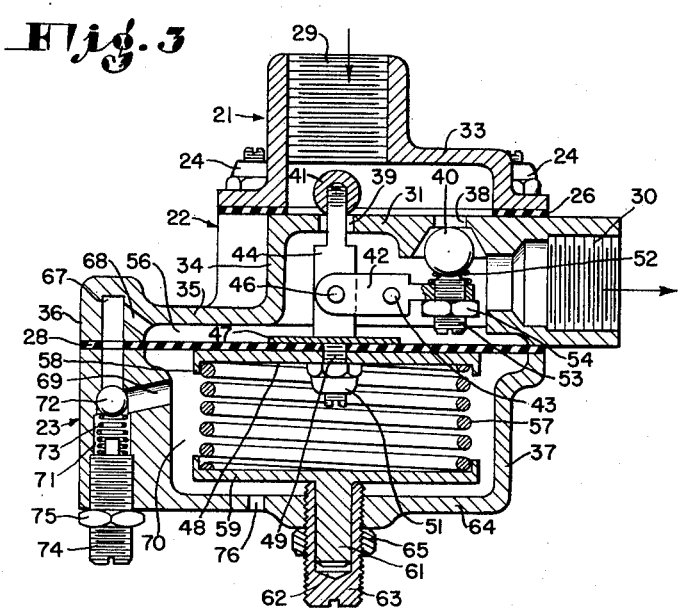
Fig. 3 is a vertical longitudinal sectional view of the valve.

The system shown in Fig. 1, for the purpose of illustrating an arrangement in which the valve of my invention is particularly useful, includes a pressure source (such as a supercharger) 6 adapted to supply air under pressure through a duct 7 to the cabin enclosure 8 of a pressurized cabin aircraft. The air from the duct 7 passes to the enclosure 8 through a flow control valve 9. The outflow from the cabin is controlled by a pressure regulator 10, which is vented to the atmosphere. A maximum pressure in the cabin enclosure 8 may be regulated by a pressure relief valve 11. A vacuum relief valve 12 functions to equalize the pressure in the cabin enclosure 8 with ambient atmospheric pressure when the latter exceeds the cabin pressure.

The pressure source 6, in addition to its main function of supplying air to the cabin enclosure 8 for ventilating and maintaining the desired pressure therein, may also apply pressure to the fuel in tanks 13 and 13a, through branch air lines 14 and 14a. A portion of the air pumped by the pressure source 6 may also be diverted, through an air line 15, to an instrument or number of instruments 16 within the cabin enclosure 8, for operating the same.

The pressure applied to the fuel tanks 13 and 13a and to the instruments 16 is regulated by pressure controlled valves 17, 17a, and 18, all of which incorporate the present invention.

Referring now to Figs. 2 and 3, my pressure regulating valve embodies three separable housing sections 21, 22, and 23, the sections 21 and 22 being secured together by bolts 24, with the gasket 26 interposed therebetween, and the sections 22 and 23 being secured together by bolts 27 with a flexible diaphragm 28, of rubber or equivalent material, interposed therebetween and serving as a gasket as well as a pressure sensitive element for operating the valve. The housing section 21 is formed with a fluid inlet 29. The intermediate housing section 22 is formed with a fluid outlet 30 and with a wall 31 which forms a barrier between the mating valve housing portions 33 and 34 respectively of the sections 21 and 22. The intermediate section 22 includes a radially extending flange 35 having around its periphery a rim portion 36 cooperating with the rim of the lateral wall 37 of the section 23 to clamp the diaphragm 28.

The sections 21 and 22 and the diaphragm 28 cooperate to define a fluid flow passage which is traversed by the wall 31 and divided thereby into two parallel passages comprising the valve ports 38 and 39 which are formed in the wall 31.

Spherical valve elements 40 and 41 cooperate with valve seats formed at the edges of the ports 38 and 39 on opposite sides of the wall 31, the valve element 40 closing against the flow of the fluid and the valve element 41 closing with the flow of the fluid.

Simultaneous opening and closing movements are transmitted to the valve elements 40 and 41 by a rocker arm 42 fulcrumed on a pin 43, the ends of which are mounted in the wall portion 34 of the housing section 22. The valve 41 is threaded onto the end of a link 44 which projects through the port 39, is pivoted to the rocker arm 42 at 46, extends beyond the rocker arm and is attached to the center of the diaphragm 28. A pair of washers 47 and 48 engage the opposite sides of the central region of the diaphragm and the link 44 is provided with a reduced threaded end 49 which extends through the washers 47 and 48 and has threaded thereon a nut 51 which secures the several parts in assembly.

The valve element 40 is yieldingly engaged by a frusto-conical coil spring 52 which is secured to the end of an adjusting screw 53 threaded through the other end of the rocker arm 42 and secured by a lock nut 54.

The intermediate housing section 34 cooperates with the diaphragm 28 to define a pressure chamber 56 in which the pressure of the fluid flowing through the valves is applied to the upper side of the diaphragm 28. Opposing this pressure is the pressure of the spring 57 against the other side of the diaphragm and the pressure from a vent 76, the spring 57 being engaged between the washer 48 (which has a peripheral flange 58 for piloting the spring) and an adjustable plate 59 (similarly flanged) having a cylindrical shank 61 piloted in a bore 62 in an adjusting screw 63 which is threaded in the bottom wall 64 of the housing section 23. A lock nut 65 secures the adjusting screw 63 in any position to which it is adjusted. By varying the position of the adjusting screw 63, the pressure exerted against the diaphragm 28 by the spring 57 may be varied, and the pressure at which the valves 40 and 41 will close is correspondingly varied.

To avoid injury to the valve mechanism which might result from pressure surges embodying pressures considerably in excess of the valve closing pressures, I provide a pressure relief passage 67, formed partially in the housing section 22 and partially in the housing section 23, the upper end of the passage 67 communicating through a port 68 with the pressure chamber 56 and the lower end of the passage 67 communicating through a port 69 with the spring housing chamber 70 defined between the diaphragm and the section 23. An enlarged extension 71 of the passage 67 forms, at the junction therewith, a valve seat against which is normally seated a ball valve element 72. A pressure higher than the pressure at which the valve elements 40 and 41 are adapted to close, is yieldingly exerted against the valve element 72 by a spring 73, the compression of which may be varied by an adjusting screw 74 threaded into the lower end of the passage extension 71 and secured by a lock nut 75. A relief valve opening pressure is set at a slightly higher level than the closing pressure for the valves 40 and 41, in order that the relief valve may normally remain closed, but will open to relieve excessive pressures above the normal valve closing pressure. The spring housing chamber 70 is vented through a vent 76 in the bottom housing wall 64.

The spring housing chamber 70 may be vented either to the atmosphere or to the cabin enclosure, depending upon the pressure to be held by the valve. The valve 17 which controls the pressure in the tank 13 is vented to atmosphere.

Where it is desired to vent the valve to the cabin, and to have the valve located outside of the cabin enclosure, a vent tube 77 communicating with the spring housing chamber 70 may be employed. As an example of such an arrangement, the valve 18 is shown in Fig. 1 as being located outside the cabin and connected to the cabin by such a vent tube.

In the operation of the valve, as long as the pressure in the chamber 56 is below the critical valve closing pressure, the spring 57 will maintain the diaphragm in a position in which the valve element 41 is held away from contact with its valve seat and the valve element 40 is permitted to be held away from contact with its seat by the action of the fluid flowing through the port 38. The pressure of the fluid flow against the valves 40 and 41 is substantially balanced, through the rocker arm 42, the fulcrum 43 being located midway between the axes of the valves 40 and 41. When the pressure in the chamber 56 is raised to the critical valve closing point, the diaphragm 28, acting under such pressure and overcoming the pressure of the spring 57, will move to a position wherein the valve 41 will be drawn to closed position and the valve element 40 will be yieldingly pushed to its closed position.

The pressure exerted by the spring 57 is equal to the differential between the valve closing pressure (for example, the pressure to be maintained in the fuel tanks 13 and 13a) and the vent pressure.

Figure 4:
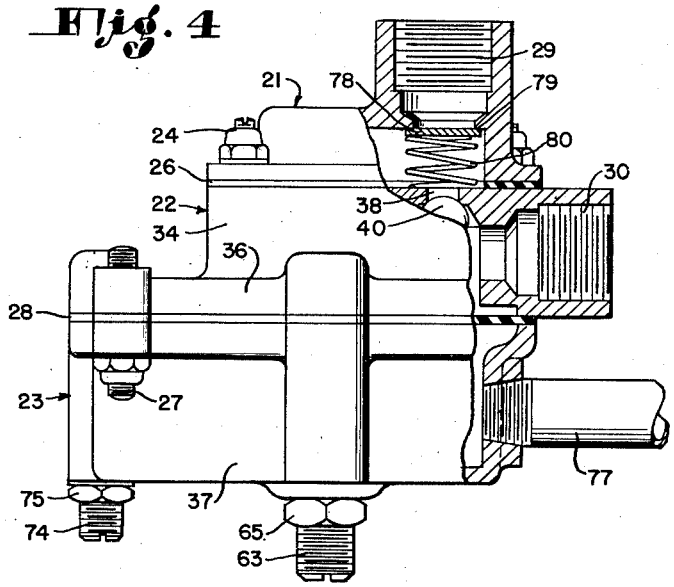
Fig. 4 is a vertical longitudinal sectional view of a valve embodying a modified form of the invention.

It may be important in many installations to provide for holding the pressure in the chamber closed by the valve, and for this purpose I provide, as shown in Fig. 4, a check valve in the form of a disc 78 adaped to engage a valve seat 79 in the inlet 29 and to close under the back pressure from such chamber in the event of failure of the pressure source. The closing movement is assured and assisted by a light spring 80.

With the exception of the above described feature, the valve shown in Fig. 4 is the same in construction as the valve shown in Figs. 2 and 3, and similar reference numerals have been employed to indicate those parts which are shown, the majority of the valve being shown in elevation to avoid duplication of the identical parts.

I claim as my invention:

1. A fluid pressure control valve, comprising: means forming a fluid flow passage having a barrier thereacross provided with a pair of ports through which the fluid may flow in a divided stream; a rocker arm pivoted intermediate its ends and located in said passage; a pair of valve members for controlling said ports; a link connecting one end of said rocker arm to one of said valves; an adjustable screw on the other end of said rocker arm; a yielding connection between said screw and the other of said valves, said yielding connection being attached at one end to said screw and said link and yielding connection being adapted to transmit closing movement from said rocker arm simultaneously to both of said valves; and an actuator responsive to a predetermined increase in pressure in said passage for transmitting such closing movement to said rocker arm.

2. A fluid pressure control valve, comprising:

means forming a passage having a barrier provided with a pair of ports through which liquid may flow in separated streams; a pair of balanced ball valves for controlling said ports, one of said valves being on one side of said barrier and the other of said valves being on the opposite side of said barrier, closable, one with and the other against the fluid flow for arresting said fluid flow; a rocker arm in said passage pivoted intermediate its ends; a link pivoted to one end of said rocker arm and having a threaded end which projects through one of said ports, one of said ball valves being threadably mounted on said threaded end; an adjustment screw on the opposite end of said rocker arm; a spring connected to said screw and providing a yielding connection with the other of said ball valves, said yielding connection pressing said other ball valve toward closed position; and means forming an enlarged pressure chamber in communication with said passage, said means including as one wall thereof a flexible diaphragm sensitive to the pressure in said chamber, said link being attached to said diaphragm.

3. In a fluid pressure control valve, means forming a fluid flow passage having a barrier thereacross provided with a pair of ports through which the fluid may flow in divided streams, a rocker arm pivoted intermediate its ends in said passage, a pair of valve members for controlling said ports, a link connecting one end of said rocker arm to one of said valves, an adjustable screw on the other end of said rocker arm, a yielding connection between said screw and the other valve, said link and yielding connection being adapted to transmit closing movement from said rocker arm simultaneously to both of said valves, and an actuator responsive to a predetermined increase in pressure in said passage for transmitting such closing movement to said rocker arm.

HAROLD CRUZAN.

REFERENCES CITED

The following references are of record in the file of this patent:

UNITED STATES PATENTS

| Number | Name | Date |
| --- | --- | --- |
| 151,580 | Eversol | June 2, 1874 |
| 329,928 | Merrill | Nov. 10, 1885 |
| 548,172 | Bastain | Oct. 22, 1895 |
| 601,878 | Matchett | Apr. 5, 1898 |
| 702,236 | McAdams | June 10, 1902 |
| 1,843,953 | McKinney | Feb. 9, 1932 |
| 2,013,222 | Thomas | Sept. 3, 1935 |
| 2,047,101 | Grove | July 7, 1936 |
| 2,053,931 | Work | Sept. 8, 1936 |
| 2,119,471 | Messinger | May 31, 1938 |
| 2,338,760 | Deming | Jan. 11, 1944 |

FOREIGN PATENTS

| Number | Country | Date |
| --- | --- | --- |
| 164,617 | Switzerland | Dec. 16, 1933 |